United States Patent [19]

Shimizu et al.

[11] 3,912,693
[45] Oct. 14, 1975

[54] PROCESS FOR PRODUCING POLYAMINES

[75] Inventors: Kiyoshi Shimizu; Susumu Harada, both of Koriyama, Japan

[73] Assignee: Nitto Boseki Co., Ltd., Koriyama, Japan

[22] Filed: Apr. 2, 1974

[21] Appl. No.: 457,359

[30] Foreign Application Priority Data

| Apr. 5, 1973 | Japan | 48-38947 |
| July 9, 1973 | Japan | 48-77230 |
| July 26, 1973 | Japan | 48-84285 |
| Oct. 4, 1973 | Japan | 48-111755 |

[52] U.S. Cl. 260/78.5 BB; 204/159.22; 204/159.23; 260/80.3 N; 260/80.3 R; 260/86.1 R; 260/86.1 N
[51] Int. Cl.² C08F 2/48; C08F 2/50; C08F 222/06; C08F 226/04
[58] Field of Search... 260/78.5 BB, 80.3 R, 80.3 N, 260/86.1 R, 86.1 N; 204/159.22

[56] References Cited
UNITED STATES PATENTS

| 2,923,701 | 2/1960 | Schuller et al. | 260/85.5 |
| 3,032,539 | 5/1962 | Schuller et al. | 260/85.5 |
| 3,057,833 | 10/1962 | Devlin | 260/82.1 |
| 3,814,677 | 6/1974 | Battaerd et al. | 204/159.22 |

*Primary Examiner*—John Kight, III
*Attorney, Agent, or Firm*—Karl W. Flocks

[57] ABSTRACT

Polymers or copolymers of diallylamine derivatives of the formula,

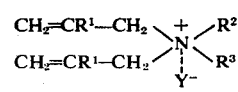

wherein $R^1$ is hydrogen or methyl: $R^2$ and $R^3$ are independently hydrogen, allyl, methallyl, straight-chain or branched-chain alkyl having 1–16 carbon atoms, phenylalkyl or hydroxyalkyl of the formula, HO—(—$CH_2$—)$_m$—, in which $m$ is an integer of 1–6 or $R^2$ and $R^3$ may form together with the adjacent N atom pyrrolidyl, piperidyl or morpholino; and Y is halogen or inorganic acid anion, are produced by conducting photopolymerization of a solution or slurry of at least one diallylamine derivative mentioned above with or without other comonomer such as maleic anhydride, maleic acid, or a vinyl compound, with irradiation of light having wavelengths of 150–500 m$\mu$. The polymerization rate can be accelerated in the presence of a special sensitizer such as benzophenone or acetophenone together with hydroquinone, dioxane, morpholine or derivative thereof, or a charge-transfer complex of sulfur dioxide and a diallylamine derivative.

27 Claims, 4 Drawing Figures

FIG. 1

FIG. 2

PROCESS FOR PRODUCING POLYAMINES

This invention relates to a process for producing polymers or copolymers of diallylamine derivatives by photopolymerization. More particularly, this invention relates to a process for producing solid polyamines or copolymers thereof having extremely high molecular weight comprising conducting photopolymerization of a solution or slurry of at least one diallylamine derivative with or without at least one comonomer with irradiation of light in the 150–500 m$\mu$ region.

It has been known that linear polymers can be obtained by cyclopolymerization of hydrochlorides or quaternary ammonium halides of diallylamine derivatives with radical initiators [Butler et al, J. Polymer Sci. 79, 3128 (1957), ibid. 80, 3615 (1958): U.S. Pat. No. 3,288,770; Japanese Patent Publication No.Sho 45-1457 (1457/1970)]. In these processes, solution polymerization using a solvent such as water or dimethylsulfoxide and a radical initiator has been employed. But the solution polymerization has many disadvantages such as separation of the produced polyamine from the solvent being necessary, to use highly pure monomer being necessary in order to obtain a polymer having extremely high molecular weight in high yield and the like. Further, in order to produce a certain polyamine, for example, from diallyldimethylammonium chloride according to the process of Hoover et al. [J. Makromol. Sci. Chem. A4 1419 (1970)], it is necessary to use such a high monomer concentration as 65–70% and a polymerization temperature of about 100°C. and to control the addition rate of the initiator so as to suppress rapid temperature rise. These conditions are disadvantageous for industrial production of polyamines.

On the other hand, photopolymerization of diallylamine derivatives has been considered impossible from the following reasons. First, from the electronic structures and configurations of diallylamine derivatives, it seems to be very difficult to polymerize diallylamine derivatives. For example, between the two configurations

[B] is stabler than [A] from the calculation based on the ASMO SCF MO method, one method of molecular orbital theory, proposed by Yonezawa et al. [Bull. Chem. Soc. Japan, 40, 1017 (1967)] and thus almost no possibility of cyclopolymerization is concluded energetically. Therefore in order to conduct the cyclopolymerization, it is necessary to select a suitable polymerization system in which a diallylamine derivative is able to take the structure of [A] in the transition state. But this is almost impossible so far as a conventional block polymerization process is employed for solid phase. Secondly, since hydrochlorides or quaternary ammonium salts of diallylamine derivatives are solid in general, transmission of light through said solids would be impossible and quantum yield would be lowered so that no photopolymerization would practically take place. Thirdly, there will be various operational difficulties in industrial production.

Recently S. Harada, one of the inventors of this invention, reported that a substantially equimolar mixture of a hydrochloride or quaternary ammonium chloride of diallylamine derivative and sulfur dioxide can form a charge-transfer complex, which can yield a poly(aminesulfone), an alternating copolymer wherein the ratio of diallylamine derivative to sulfur dioxide is 1:1, by cyclopolymerization with irradiation of light [Japanese Patent Publication No. Sho 45-37033 (37033/1970)]. This can be explained theoretically by using the ASMO SCF MO method. In transition state, the charge-transfer complex taking the biradical structure [C] is stabler than that of [D], as shown below:

Thus cyclopolymerization takes place.

By further studies on photopolymerization of diallylamine derivatives the present inventors have found that polymers and copolymers of diallylamine derivatives can easily be obtained by photopolymerization when a solution or slurry of a diallylamine derivative or a mixture of a diallylamine derivative and a comonomer is irradiated by light having wavelengths of 150–500 m$\mu$, and accomplished the present invention.

It is an object of the present invention to provide a process for producing polymers or copolymers of diallylamine derivatives by photopolymerization. It is another object of the present invention to provide a process for producing polymers or copolymers of diallylamine derivatives in the presence of a special sensitizer by photopolymerization. Further objects and advantages of the present invention will be apparent to one skilled in the art from the accompanying disclosure and discussion.

The present invention provides a process for producing a polymer or copolymer of at least one diallylamine derivative of the formula,

(1)

wherein $R^1$ is hydrogen or methyl; $R^2$ and $R^3$ are independently hydrogen, allyl, methallyl, straight-chain or branched-chain alkyl having 1–16 carbon atoms, phenylalkyl having 7–19 carbon atoms, or hydroxyalkyl of the formula HO—(—CH$_2$—)$_m$— in which $m$ is an integer of 1–6 or R$^2$ and R$^3$ may form together with the adjacent N atom pyrrolidyl, piperidyl or morpholino; and Y is halogen or inorganic acid anion, which comprises conducting photopolymerization of a solution or slurry comprising at least one diallylamine derivative of the formula (I) with or without at least one comonomer selected from the group consisting of maleic acid, maleic anhydride, N-vinylpyrrolidone and a vinyl compound of the formula, (II)

wherein R$^4$ is hydrogen or methyl; and Z is a group of the formula, —OR$^5$ (wherein R$^5$ is hydrogen, methyl, a group of the formula, —(CH$_2$)$_n$—OH in which n is an integer of 1–5, or a group of the formula, in which R$^6$, R$^7$ and R$^8$ are independently hydrogen, alkyl having 1—3 carbon atoms or benzyl; J is halogen; and $n$ is as defined above) or a group of the formula wherein R$^9$ and R$^{10}$ are independently hydrogen, alkyl having 1–5 carbon atoms or a group of the formula, —(CH$_2$)$_p$—OH in which $p$ is an integer of 1–3, and a solvent or non-solvent in an amount of 30% by weight or less based on the total weight of the monomer or monomers, with irradiation of light having wavelengths of 150–500 m$\mu$, in the presence or absence of a sensitizer.

In the diallylamine derivative of the formula (I), R$^2$ and R$^3$ include such alkyl as methyl, ethyl, propyl, isopropyl, butyl, t-butyl, hexyl, 3-methylamyl, octyl, dodecyl, tetradecyl and hexadecyl, such phenylalkyl as benzyl, 2-phenylethyl, 3-phenylpropyl, p-nitrobenzyl, such hydroxyalkyl as hydroxymethyl, $\beta$-hydroxyethyl, 4-hydroxybutyl, 5-hydroxyamyl, 6-hydroxyhexyl; Y includes such halogen as Cl, Br and I and such inorganic acid anion as HSO$_4$, HSO$_3$, HPO$_4$, HPO$_3$ and the like.

Examples of the diallylamine derivative of the formula (I) are as follows:

a. Salts such as hydrochlorides, hydrobromides, hydroiodides, sulfates, sulfites, phosphates and phosphites of diallylamine, dimethyllyamine (hereinafter methallyl derivatives corresponding to the allyl derivatives are omitted for simplicity but are included in this invention), N-methyldiallylamine, N-ethyldiallylamine, N-n-propyldiallylamine, N-isopropyldiallylamine, N-n-butyldiallylamine, N-t-butyldiallylamine, N-n-amyldiallylamine, N-hexyldiallylamine, N-octyldiallylamine, N-lauryldiallylamine, N-tetradecyldiallylamine, N-hexadecyldiallylamine, N-N-diallylbenzylamine, N,N-diallyl-p-nitrobenzylamine, N-$\beta$-hydroxyethyldiallylamine, N-$\gamma$-hydroxypropyldiallylamine, N-2-phenylethyldiallylamine, N-3-phenylpropyldiallylamine, N-4-hydroxybutyldiallylamine, N-6-hydroxyhexyldiallylamine.

b. Salts such as hydrochlorides, hydrobromides, hydroiodides, sulfates, sulfides, phosphates and phosphites of tertiary amines containing three allyl or methallyl groups such as triallylamine, trimethallylamine, allyldimethallylamine, diallylmethallylamine.

c. Quaternary ammonium salts of diallylamine derivatives such as diallyldimethylammonium chloride, diallyldimethylammonium bromide, diallyldimethylammonium iodide, (hereinafter bromides and iodides corresponding to the chlorides are omitted for simplicity but are included in this invention), dimethyldimethyllylammonium chloride (hereinafter methallyl derivatives corresponding to the allyl derivatives are omitted for simplicity but are included in this invention), diallyldiethylammonium chloride, diallyldi-n-propylammonium chloride, diallylmethylethylammonium chloride, diallylmethylpropylammonium chloride, diallylmethyl-$\beta$-hydroxyethylammonium chloride, diallylmethylbutylammonium chloride, diallyldihexylammonium chloride, methyllauryldiallylammonium chloride, methylhexadecyldiallylammonium chloride, diallylmethylbenzylammonium chloride, methyl2-phenylethyldiallylammonium chloride, diallylpyrrolidinium chloride, diallylpiperidinium chloride, diallylmorpholinium chloride, methyltriallylammonium chloride, ethyltriallylammonium chloride, propyltriallylammonium chloride, $\beta$-hydroxyethyltriallylammonium chloride, benzyltriallylammonium chloride, n-hexyltriallylammonium chloride, tetraallylammonium chloride.

In order to obtain polymers of diallylamine derivatives of the formula (I) a solution or slurry comprising at least one diallylamine derivatives of the formula (I) and a solvent or non-solvent in an amount of 30% by weight or less based on the weight of the monomer is prepared.

Diallylamine derivatives of the formula (I) are solid but in general highly hygroscopic, although differences are present depending on the kinds of them, so that addition of a small amount of water to them or heating them gives a semi-solid, viscous slurry mixture. Since the removal of all the water from said diallylamine derivatives completely is very difficult industrially, diallylamine derivatives can be used without removing water.

As the solvent or non-solvent, water, or methyl alcohol, dimethylsulfoxide, ethyl alcohol, isopropyl alcohol, acetone or an aqueous solution thereof may be used.

The solvent or non-solvent is used in an amount of 30% by weight or less, preferably 20% by weight or less based on the weight of the monomer or monomers of the formula (I).

Higher monomer concentration is generally preferable in the process of the present invention. It is not always necessary to dilute the system so as to obtain a uniform solution, and only a slurry is sufficient to carry out photopolymerization. To use such a solution or slurry has many advantages in carrying out photopolymerization smoothly, increasing the quantum yield, adding a sensitizer to the reaction system and the like.

Since the solution or slurry of the monomer or monomers obtained as mentioned above is generally fluid, said solution or slurry is used for photopolymerization preferably in the form of a film or plate obtained by extruding it through a slit or nozzle. The thickness of said film or plate may be 0.1–5 cm, preferably 0.4–2 cm. Polymerization rate of thinner film is naturally faster than thick one, but even using a thicker plate, polyamines having almost the same conversion and polymerization degree as those obtained from a thinner film can be obtained with longer irradiation time. Said film or plate may be extruded continuously on a belt conveyer. Said film or plate may be covered with a film of a resin such as polyethylene or polyproplene showing no absorption in the 300–450 mμ region or may be extruded into a tube or a bag of said resin.

If a solution or slurry of the monomer or monomers has low viscosity, it may be used for photopolymerization as it is, or it may be treated as mentioned below to obtain a highly viscous solution or slurry which is extruded into a film or plate as mentioned above. In order to obtain a highly viscous solution or slurry, a solution or slurry having low viscosity is placed in a reactor equipped with a light source inside of the reactor and is irradiated with light with stirring for a suitable time. As a light source, a low-pressure mercury-arc lamp is more preferable than a fluorescent lamp in shortening polymerization time.

Figure 1:
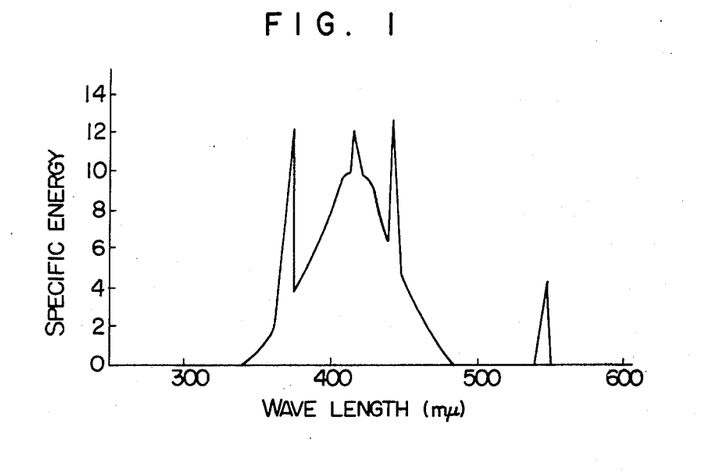
Figure 2:
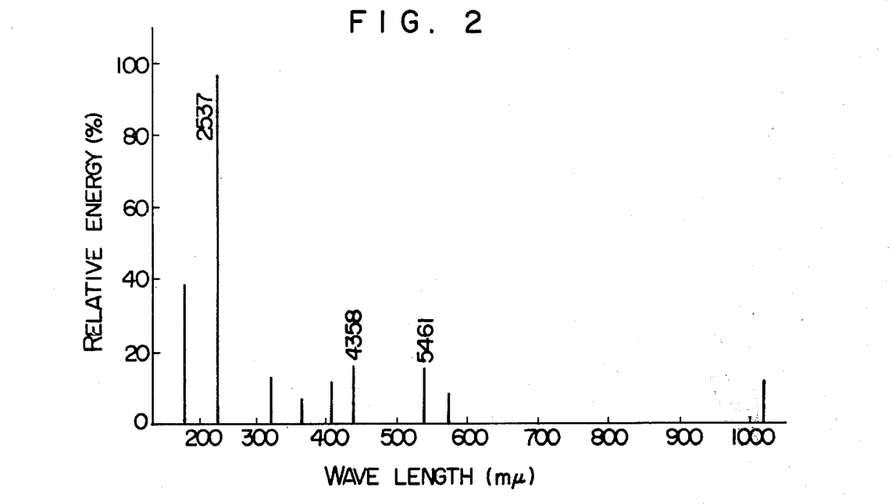

Photopolymerization of the solution or slurry of the monomer or monomers is carried out with irradiation of light having wavelengths of 150–500 mμ on the solution or slurry, or on the extruded film or plate of said solution or slurry. As a light source, sunlight may be used but a fluorescent lamp or a low-pressure mercury-arc lamp is more preferable. In the attached drawings, FIG. 1 shows wavelength distribution of a fluorescent lamp and FIG. 2 shows that a low-pressure mercury-arc lamp. The intensity of light may be varied depending on the kind of the monomer used, the thickness of the film or plate used, polymerization time, polymerization temperature and the like.

The polymerization temperature used may be in the range of from -10° to 100°C, preferably from 10° to 60°C. If the temperature is lowered too low, the fluidity of the solution or slurry is decreased too little to extrude the solution or slurry and therefore the advantages to use a solution or slurry of the monomer or monomers is also diminished. Since the temperature of the solution or slurry tends to increase during the iradiation of light due to polymerization heat, it is preferable to use a temperature of 60°C or lower at the initiation of the irradiation.

When the solution or slurry of the monomer or monomers is heated at 80°C for 150 hours without exposed to light, almost no polymerization takes place. If a suitable radical initiator is added to the system mentioned above, polymerization proceeds explosively after a certain induction period and the control of the temperature is very difficult. On the contrary, the photopolymerization of the present invention can be carried out mildly with the irradiation in the 150–500 mμ region. Further since the polymerization can be terminated by excluding light, it is very easy to control the temperature. When light of wavelength outside the region of 150–500 mμ is used, the objects of the present invention cannot be attained effectively.

In the photopolymerization of the present invention, a sensitizer may be used. In order to obtain polyamines in high yield in a remarkably short time with increased polymerization rate, it is very effective to use a mixture of at least one compound of the formula, (III)

wherein A is phenyl, phenyl substituted by $R^{11}$ or straight-chain or branched-chain alkyl having 1–5 carbon atoms; and $R^{11}$ is hydrogen, halogen, methoxy, nitro or straight-chain or branched-chain alkyl having 1 5 carbon atoms, and at least one member selected from the group consisting of compounds of the formulae, (IV-a)   (IV-b)   (IV-c)

wherein $R^{11}$ is as defined above; $R^{12}$ is hydrogen or straight-chain or branched-chain alkyl having 1–5 carbon atoms; X is $-CH_2-$, $-O-$, $-NR^{12}$ or $-N(CH_2CH_2OH)-$; $R^{13}$, $R^{14}$ and $R^{15}$ are independently hydrogen, alkyl having 1–3 carbon atoms, hydroxymethyl, β-hydroxyethyl, γ-hydroxypropyl, benzyl, allyl or methallyl but $R^{13}$, $R^{14}$ and $R^{15}$ cannot be hydrogens at the same time, as a sensitizer.

Among the compounds of the formula (III), benzophenone and acetophenone are already known as sensitizer for photopolymerization of vinyl compounds [e.g. H. W. Melvile et al., Proc. Roy. Soc. Dyers, Col., 119 (1949)]. But when benzophenone or acetophenone is used as a sensitizer in photopolymerization of a diallylamine derivative, no remarkable effect of it can be recognized. These facts show that the action of benzophenone or acetophenone for diallylamine derivatives is quite different from that for vinyl compounds. In the latter case, it is explained that a triplet excited state of benzophenone or acetophenone takes part in the initiation of the polymerization. On the other hand, compounds of the formulae (IV-a)–(IV-c) have no sensitizing activities. Above all, hydroquinone is known as radical polymerization inhibitor for vinyl compounds. Therefore it is very surprising finding that a mixture of a polymerization inhibitor such as hydroquinone and benzophenone or acetophenone has excellent sensitizing activity in the photopolymerization of diallylamine derivatives.

Examples of compounds of the formula (III) are as follows:

Benzophenone or nuclear substituted benzophenones such as 2-chlorobenzophenone, 3-chlorobenzophenone, 4-chlorobenzophenone, 2,4-dichlorobenzophenone, 4,4'-dichlorobenzophenone, 2-bromobenzophenone, 2-iodobenzophenone, 4-methoxybenzophenone, 4-nitrobenzophenone, 4-methylbenzophenone, 4-propylbenzophenone, 4-isopropylbenzophenone, 4-n-butylbenzophenone, 4-t-butylbenzophenone, 4-n-amylbenzophenone, 2-chloro- 4-nitrobenzophenone, 4-chloro-4'-methoxybenzophenone, 4,4'-dinitrobenzophenone, 4-chloro-4'-ethylbenzophenone, 4-methoxy-4'-isopropylbenzophenone, etc.

Phenyl alkyl ketones or nuclear substituted phenyl alkyl ketones such as acetophenone, 2-chlorophenyl methyl ketone, 4-chlorophenyl methyl ketone, 4-bromophenyl methyl ketone, 4-iodophenyl methyl ketone, 2,4-dichlorophenyl methyl ketone, 4-methoxyphenyl methyl ketone, 4-nitrophenyl methyl ketone, 4-methylphenyl methyl ketone, 4-propylphenyl methyl ketone, 2-chloro-4-nitrophenyl methyl ketone, phenyl ethyl ketone, 4-chlorophenyl ethyl ketone, phenyl propyl ketone, 4-methoxyphenyl propyl ketone, phenyl butyl ketone, phenyl t-butyl ketone, phenyl amyl ketone, 4-methoxyphenyl amyl ketone, etc.

Examples of compounds of the formulae (IV-a), (IV-b) and (IV-c) are as follows:

a. Hydroquinone and its derivatives such as 2-chlorohydroquinone, 3-chlorohydroquinone, 2-bromohydroquinone, 2-iodohydroquinone, 2-methoxyhydroquinone, 2-nitrohydroquinone, 2-methylhydroquinone, 2-ethylhydroquinone, 2-isopropylhydroquinone, 2-amylhydroquinone, hydroquinone monomethyl ether, 2,5-dichlorohydroquinone monomethyl ether, 2-methylhydroquinone monomethyl ether, 3,4-dimethoxyhydroquinone monoethyl ether, hydroquinone monopropyl ether, hydroquinone monoisopropyl ether, 2-nitrohydroquinone monopropyl ether, hydroquinone monobutyl ether, hydroquinone monoamyl ether, 2-methylhydroquinone monoamyl ether, etc.

b. Dioxane, tetrahydropyran, morpholine, N-methyl morpholine, N-ethyl morpholine, N-propyl morpholine, N-isopropyl morpholine, N-butyl morpholine, N-t-butyl morpholine, N-amyl morpholine, N-($\beta$-hydroxyethyl) morpholine, etc.

c. Primary, secondary and tertiary amines such as methylamine, dimethylamine, trimethylamine, diethylamine, triethylamine, tripropylamine, monohydroxymethylamine, dihydroxymethylamine, monoethanolamine, diethanolamine, triethanolamine, di-$\gamma$-hydroxypropylamine, methyldiethanolamine, benzylamine, methylbenzylamine, dimethylbenzylamine, allylbenzylamine, methylallylamine ethylmethallylamine, methyldiallylamine, diallylbenzylamine, etc.

Above all, combinations selected from the following groups are more preferable:

Group of the formula (III): benzophenone, acetophenone.

Group of the formulae (IV-a)–(IV-c): hydroquinone, hydroquinone monomethyl ether, hydroquinone monoethyl ether, dioxane, morpholine, N-methyl morpholine, N-($\beta$-hydroxyethyl) morpholine.

At least one compound of the formula (III) and at least one compound of the formulae (IV-a)–(IV-c) are mixed in a solvent to give a sensitizer solution. As the solvent, alcohols such as methanol, ethanol, t-butanol, are preferable. The proportion of the compound of the formula (III) to the compound of the formulae (IV-a)–(IV-c) may generally be 1:1 in molar ratio, but the molar ratio may be varied widely. When one component is liquid at room temperature and may be used as a solvent for the other component, e.g. benzophenone-dioxane or acetophenone-hydroquinone system, said liquid component may be used in excess and no addition of a solvent is necessary.

The sensitizer solution may contain about 5–50% by weight, preferably about 10–20% by weight of the mixture of at least one compound of the formula (III) and at least one compound of the formulae (IV-a)–(IV-c). The sensitizer solution is added to the solution or slurry of the monomer or monomers in an amount of 0.5–10 parts by weight, preferably 1–5 parts by weight based on 100 parts by weight of the latter.

When the sensitizer solution is irradiated by light such as sunlight, it decomposes and decreases its effects on photopolymerization. It is preferable to prepare a sensitizer solution just before photopolymerization and to add it immediately to the solution or slurry to be polymerized. When a sensitizer solution is to be stored, it should be placed in a brown bottle so as to avoid the irradiation of light.

The solution or slurry of the monomer or monomers containing a sensitizer uniformly can be polymerized as mentioned above. Initial temperature of the polymerization may be lower than that required in the case of the solution or slurry containing no sensitizer. It is preferable to initiate photopolymerization at a temperature of from room temperature to 30°C. Irradiation time may be varied depending on the kind and intensity of light, the kind of monomer used, the amount and combinations of sensitizer, etc. In general, the sensitizer as mentioned above is used, the photopolymerization may be completed within one hour, or in 5 hours at most. Further, when the sensitizer as mentioned above is used, purity of the monomer in the solution or slurry is not so required as the case of using no sensitizer and polymers having almost the same percent polymerization and polymerization degree can be obtained from the solution or slurry of the monomer or monomers having lower purity.

Another highly effective sensitizer is a charge-transfer complex of sulfur dioxide and a diallylamine derivative of the formula (I). Said complex can be formed by adding sulfur dioxide to the solution or slurry of the monomer or monomers to be polymerized. Alternatively an equimolar mixture of a diallylamine derivative of the formula (I) and sulfur dixoide or a solution thereof may be used. As the solvent for the equimolar mixture, water or methyl alcohol, ethyl alcohol, isopropyl alcohol, dimethylsulfoxide, acetone or an aqueous solution thereof may be used. The diallylamine derivative in said equimolar mixture may be the same or different one as in the solution or slurry of the monomer or monomers to be polymerized. When the diallylamine derivative of the formula (I) to be polymerized has less reactivity with sulfur dioxide, it is preferable to add an equimolar mixture of sulfur dioxide and a diallylamine derivative having much more reactivity with sulfur dioxide or a solution thereof to the solution or slurry to be polymerized. In general, diallylammonium derivatives are more reactive with sulfur dioxide than diallylamine derivatives. The diallylammonium derivative having much more reactivity with sulfur dioxide includes, for example, diallyldiethylammonium chloride, diallyldiethylammonium chloride, or diallylmorpholinium chloride.

The amount of the charge-transfer complex of sulfur dioxide and a diallylamine derivative to be used is, converted on a sulfur dioxide basis, about 0.5–10% by weight, preferably about 1–5% by weight based on the solution or slurry of the monomer or monomers to be polymerized.

After the addition of sulfur dioxide or an equimolar mixture of sulfur dioxide and a diallylamine derivative to the solution or slurry of the monomer or monomers, photopolymerization may be carried out according to the process mentioned above. It is preferable to use light having wavelengths of 250–450 m$\mu$ and the initial temperature of from room temperature to 30°C. As a light source, a fluorescent lamp may be used sufficiently since the quantum yield is extremely increased in the system but other light such as a low-pressure mercury-arc lamp or sunlight may also be used.

When the charge-transfer complex sensitizer is used, the photopolymerization may generally be completed within 10 hours, or in 15 hours at most when less polymerizable monomers are used. When no sensitizer is added, it generally takes 13 hours or more, about 24 hours in most cases and about 48 hours when less polymerizable monomers are used to complete the photopolymerization. The solution or slurry of the monomer or monomers having lower purity may also be used when the charge-transfer complex sensitizer is used.

Sulfur dioxide, which is used as one component of the sensitizer, may be copolymerized with diallylamine derivatives, but so far as the infrared spectrum shows, the resulting polymer is substantially the same as that obtained by a conventional process, i.e. polyamine, in physical and chemical properties and has no absorption bands due to sulfur dioxide at 1300, 1120 and 510 cm$^{-1}$. This means that sulfur dioxide acts as a sensitizer and this excellent action is not obvious from an alternating copolymer prepared from an equimolar mixture of sulfur dioxide and a diallylamine derivative by photopolymerization.

The thus obtained polymers are solid, and therefore they can be applied to practical use only by crashing them into powder. The thus obtained block polymers may be dissolved in a solvent such as water or methanol and reprecipitated in a large amount of non-solvent such as acetone followed by filtration and drying to obtain the purified polymers.

The process of the present invention has the following advantages: It is not necessary to use highly pure monomers as required in a conventional solution polymerization, the polymerization can be carried out mildly without taking place rapid temperature rise during polymerization, the obtained solid polymers can be used only be making them into powder, the molecular weights of thus obtained polymers are generally larger than that of a conventional solution polymerization. Therefore, the process of the present invention is very favourable industrially.

The obtained polyamines can be used in various field as taught by the prior art literature and are particularly useful in the following applications; an accelerator for coagulation and precipitation of a suspension, a coagulating-precipitating agent for white liquor from paper mills, a filter aid for treating drainage from urban sewers, a treating agent for increasing wet strength of paper, a sizing agent for paper, a setting agent for sizing agents, a treating agent for electro-conductive paper, a soil conditioner in agriculture and civil engineering, an antistatic agent for woven fabric and plastic molded articles, a vulcanization accelerator for rubber, a protective colloid, a binder for glass fibers, a polymer surfactant, a curing agent for epoxy resins, a thickener, a photopolymer, and the like.

Copolymer of diallylamine derivatives of the formula (I) and maleic acid or maleic anhydride can be obtained by photopolymerization of an admixed solution or slurry of at least one diallylamine derivative of the formula (I) and maleic acid or maleic anhydride.

It is known that maleic acid or maleic anhydride alone cannot give polycarboxylic acid having high molecular weight but maleic acid or maleic anhydride can be copolymerized with a vinyl compound. Although the copolymerization of maleic acid and allyl phenyl ether, a monoallyl compound, is reported in Japanese Patent Publication NO. Sho 42-20776 (20776/1967), copolymerization of a diallylamine derivative and maleic acid or maleic anhydride is not known at all. Copolymerization of maleic acid or maleic anhydride and a diallylamine derivative in an aqueous solution with a radical initiator can only give a copolymer having low polymerization degree. According to the process of the present invention, novel copolymers of diallylamine derivatives and maleic acid or maleic anhydride having high molecular weight can be obtained in high yield by photopolymerization.

An admixed solution or slurry of at least one diallyamine derivative of the formula (I) and maleic acid or maleic anhydride can be prepared by adding maleic acid or maleic anhydride to at least one diallylamine derivative and after mixing them adding a solvent or non-solvent thereto. Alternatively, the admixed solution or slurry can be prepared by adding maleic acid or maleic anhydride or a solution thereof, the solvent being, for example, water or acetone, to a solution or slurry of at least one diallylamine derivative, containing preferably about 5–20% by weight of water, and if necessary, adding an additional amount of a solvent or non-solvent to adjust the viscosity of the mixture. The latter method is more preferable for industrial scale production.

The amount of maleic acid or maleic anhydride, a co-monomer, to be added can be selected optionally depending on uses of the resulting copolymers, but usually is about 0.01–2.0 moles, preferably about 0.1–0.5 mole per mole of the diallylamine derivative. But when above 2.0 moles of maleic acid or maleic anhdride are used, polymerization rate may generally be lowered.

As the solvent or non-solvent, that described in the preparation of the solution or slurry of diallylamine derivative (s) alone may be used. The amount of the solvent or non-solvent in the admixed solution or slurry of the monomers is 30% by weight or less, preferably about 20% by weight or less based on the total weight of the monomers.

Photopolymerization of the admixed solution or slurry of the monomers can be carried out using manners similar to those described in the photopolymerization of diallylamine derivative (s). It is preferable to use light having wavelengths of 200–500 m$\mu$, more preferably 300–450 m$\mu$. As a light source, a fluorescent lamp is usually used but not limited thereto. Under suitable conditions, the polymerization may be completed in 1–20 hours.

When the sensitizer solution containing at least one compound of the formula (III) and at least one compound of the formulae (IV-a)–(IV-c), or the charge-transfer complex of sulfur dioxide and diallylamine derivative (s), as mentioned above is used in the same manner as described above, apparent polymerization rate increases extremely and polymerization time can be shortened.

The thus obtained copolymers are solid, and therefore they can be applied to practical use only by crashing them into powder. The resulting copolymers may also be purified by a conventional method.

Copolymers of diallylamine derivatives and maleic acid or maleic anhydride are highly hygroscopic and this property becomes more remarkable with an increase of the proportion of maleic acid or maleic anhydride in the copolymers. The copolymers are soluble in water or an alcohol but insoluble in acetone. The infrared spectra of the copolymers show absorptions characteristic of the diallylamine polymer together with the absorption band due to a carbonyl group at 1720 cm$^{-1}$. This shows that the copolymer is a linear copolymer of a diallylamine derivative and maleic acid or maleic anhydride and a linear polymeric ampholite.

Copolymers of diallylamine derivatives and maleic acid or maleic anhydride are useful as a coagulant, a treating agent for fibers, and the like.

Copolymers of diallylamine derivatives of the formula (I) and N-vinylpyrrolidone or vinyl compounds of the formula (II) can also be obtained by photopolymerization in the presence of a charge-transfer complex of sulfur dioxide and a diallylamine derivative of the formula (I).

Copolymers of diallylamine derivatives and acrylamide or acrylic acid have been prepared by solution polymerization using radical initiators [U.S. Pat. No. 2,923,701, U.S. Pat. No. 3,147,218, and Japanese Patent Publication No. Sho 46-30441 (30441/1971)] but no process for preparation of said copolymers by photopolymerization has been reported.

Vinyl compounds of the formula (II) inlcude, for example, acrylic acid, methacrylic acid, methyl acrylate, methyl methacrylate (hereinafter methacrylate derivatives corresponding to the acrylate derivatives are omitted for simplicity but are included in this invention), 2-hydroxyethyl acrylate, 3-hydroxypropyl acrylate, 4-hydroxybutyl acrylate, 5-hydroxyamyl acrylate, methylaminomethyl acrylate hydrochloride, methylaminomethyl acrylate hydrobromide, methylaminomethyl acrylate hydroiodide (hereinafter hydrobromides and hydroiodides corresponding to the hydrochlorides are omitted for simplicity but are included in this invention), dimethylaminomethyl acrylate hydrochloride, diethylaminomethyl acrylate hydrochloride, dipropylaminomethyl acrylate hydrochloride, dimethylaminoethyl acrylate hydrochloride, dimethylaminopropyl acrylate hydrochloride, diemthylaminopropyl acrylate hydrochloride, dimethylaminoamyl acrylate hydrochloride, ethylaminoethyl acrylate hydrochloride, diethylaminoethyl acrylate hydrochloride, methylbenzylaminoethyl acrylate hydrochloride, methylethylaminoethyl acrylate hydrochloride, dimethyllbenzylammonmiummethyl acrylate chloride, dimethylbenzylammoniummethyl acrylate bromide, diemthylbenzylammoniummethyl acrylate iodide (hereinafter bromides and iodides corresponding to the chorides are omitted for simplicity but are included in this invention), dimethylbenzylammoniumethyl acrylate chloride, diethylbenzylammoniumethyl acrylate chloride, dipropylbenzylammoniumethyl acrylate chloride, dimethylbenzylammoniumpropyl acrylate chloride, acrylamide, N-methylacrylamide, N-ethylacrylamide, N-propylacrylamide, N-isopropylacryalmide, N-methylolacrylamide, N-$\beta$-hydroxyethylacrylamide, N,N-diemthylacrylamide, N,N-diethylacrylamide, N,N-dimethylolacrylamide, N,N-di$\beta$-hydroxyethylacrylamide. etc. An admixed solution or slurry of at least one diallylamine derivative of the formula (I) and at least one vinyl compound of the formula (II) can be prepared by adding at least one vinyl compound of the formula (II) to at least one diallylamine derivative of the formula (I) and after mixing them adding a solvent or non-solvent thereto. It is preferable industrially to prepare the admixed solution or slurry by adding at least one vinyl compound to a slurry of at least one diallylamine derivative containing preferably about 5–20% by weight of water, and if necessary, adding an additional amount of a solvent or non-solvent to adjust the viscosity of the mixture.

The amount of the vinyl compound to be added can be selected optionally depending on uses of the resulting copolymers, but usually is about 0.005–2.5 moles, preferably about 0.01–2.0 moles per mole of the diallylamine derivative.

As the solvent or non-solvent, those described in the preparation of the solution or slurry of diallylamine derivative(s) alone may be used. The amount of the solvent or non-solvent in the admixed solution or slurry of the monomers is 30% by weight or less, preferably about 20% by weight or less based on the total weight of the monomers.

Photopolymerization of the admixed solution or slurry of at least one diallylamine derivative and at least one vinyl compound can be carried out using manners similar to those described in the photopolymerization of diallylamine deriviative(s) alone. It is preferable to use light having wavelengths of 200–500 m$\mu$, more preferably 300–450 m$\mu$. As a light source, a fluorescent lamp is usually used but other light sources may be used.

The polymerization temperature used may be in the range of from −10° to 100°C, preferably from 10°–40°C. In the photopolymerization of a solution or slurry containing high proportion of a vinyl compound such as acrylamide, if a higher temperature is used initially, the temperature of the whole system may be raised extremely by the heat of polymerization. Under such a higher temperature, heat polymerization may take place partly and further side reactions such as deamination may take place to make the copolymer glass-like or rubber-like and insoluble. In such a case, it is preferable to add an alkali such as an aqueous solution of sodium carbonate or sodium hydroxide to the polymerization system. If the polymerization proceeds violently, it is necessary to exclude light from the system or to lessen the intensity of light, for example, by moving a light source to a distant place. In some cases, such a glass-like or rubber-like insoluble copolymer may be prepared for special uses.

Irradiation time may be varied depending on the kind and intensity of light, the kinds of monomers used, the concentration of the admixed solution or slurry of the monomer and comonomer, the ratio of the diallylamine derivative to the vinyl compound, the thickness of the solution or slurry of the monomer and comonomer, and the like. In general, the higher the proportion of the vinyl compound in the admixed solution or slurry, symmetry around the nitrogen atom in a diallyalmine derivative, or the concentration of monomers in the admixed solution or slurry becomes, the faster the polymerization proceeds and thus irradiation time can be shortened.

Since the thus produced copolymers of diallylamine derivatives and vinyl compounds are glass-like or rubber-like, they can be applied to practical use only be crashing them into small pieces. They can also be purified by dissolving them in a solvent such as water or methanol, reprecipitating with a lalrge amount of a non-solvent such as acetone followed by filtration and drying.

Copolymers of diallylamine derivatives and vinyl compounds are soluble in water or an alcohol but insoluble in acetone. Infrared spectra of these copolymers show the absorption bands characteristic of the diallylamine polymer together with the absorption band due to a carbonyl group.

Copolymers of one or more diallylamine derivatives of the formula (I) and N-vinylpyrrolidone can also be obtained using similar polymerization conditions to those used in the copolymerization of vinyl compounds of the formula (II) mentioned above in the presence of the sensitizer mentioned above.

Copolymers of diallylamine derivatives and vinyl compounds are useful as a coagulant, a treating agent for increasing wet strength of paper.

The invention is illustrated more particularly by way of the following examples but, as will be more apparent, is not limited to the details thereof.

In the following examples, yields of polymers or copolymers are calculated based on the weight of purified polymers or copolymers. The purified polymers or copolymers are obtained by crashing a solid polymer or copolymer, dissolving about 1 g of said polymer or copolymer in about 5–10 g of water, pouring the resulting solution into a large amount of acetone, filtering the precipitate, washing the precipitate with acetone, and drying it under reduced pressure at 50°C until a constant weight is reached. Inherent viscosity ($\eta_{inh}$) of a polymer or copolymer is measured using a solution dissolving 0.5 g of a purified polymer or copolymer in 100 ml of 1/10N-NaCl aqueous solution at 30°C.

EXAMPLE 1

A slurry containing about 95% by weight of a monomer was prepared by adding 1.16 kg of water to 20 kg of diallyldimethylammonium chloride (hereinafter referred to as Slurry I).

In a low-pressure polyethylene bag 0.03 mm in thickness, 1702 g of Slurry I was placed and formed into a plate about 4–5 mm in thickness. Said plate was placed on a glass plate and was irradiated by four fluorescent lamps, 40 candles, 120 cm long, having wavelength distribution as shown in FIG. 1, two of them placed 20 cm directly above and the rest of them placed 20 cm directly below said glass plate, for 48 hours. The slurry became hard paste-like after 2–3 hours' irradiation and was solidified after 8 hours' irradiation. The resulting semitransparent solid was crashed into powder. From the resulting powder, 1.3119 g of powder was dissolved in 15 ml of water. The resulting transparent solution was poured into a large amount of acetone and the precipitated material was filtered and washed with acetone. Said material was dried under reduced pressure at 50°C until a constant weight was reached. There was obtained 1.1144 g of a purified polymer. The yield was 89.4%. Elementary analysis data of the purified polymer were C, 59.50%, H, 9.85%, N, 8.61%, and Cl, 21.9%. $\eta_{inh}$ of the polymer was 3.10. Infrared spectrum of the polymer was the same as that of the polymer or diallyldimethylammonium chloride prepared by a conventional process. Thus the obtained polymer is a polyamine, i.e. a cyclic polymer of diallyldimethylammonium chloride.

EXAMPLE 2

Using a procedure similar to that described in Example 1, 200 g of Slurry of I about 2 mm in thickness was irradiated for 20 hours. The yield was 95.4%. $\eta_{inh}$ of the polymer was 3.50.

EXAMPLE 3

Using a procedure similar to that described in Example 1, 500 g of Slurry I about 10 mm in thickness was irradiated for 20 hours. The yield was 92.1%. $\eta_{inh}$ of the polymer was 3.40.

EXAMPLE 4

Using a procedue similar to that described in Example 1, 500 g of Slurry I about 30 mm in thickness was irradiated for 20 hours. The yield was 40.3%. $\eta_{inh}$ of the polymer was 3.20.

EXAMPLE 5

In a 20 l. reactor equipped with a low-pressure mercury-arc lamp having wavelength distribution as shown in FIG. 2 inside of it, 10 kg of Slurry I was placed and irradiated for 3 hours with stirring to give a paste material. The yield of the polymer was 41.73%. $\eta_{inh}$ of the polymer was 3.09. The paste material was extruded through a slit into a film about 4 mm in thickness on a belt conveyer and was irradiated by fluorescent lamps in the same manner as described in Example 1 for 10 hours. A solid polyamine was obtained in 96.26% yield. $\eta_{inh}$ of said polyamine was 3.33.

EXAMPLE 6

Using a procedure similar to that described in Example 1, 500 g of Slurry I with 20 g of methanol about 4 mm in thickness was irradiated for 40 hours. The yield was 90.21%. $\eta_{inh}$ of the polymer was 1.96.

EXAMPLE 7

A slurry was prepared by mixing 200 g of diallyldimethylammonium chloride and 20 g of an admixed solution of water and acetone in 1:4 by volume. Using a procedure similar to that described in Example 1, said slurry sbout 4 mm in thickness was irradiated for 10 hours. The yield was 89.72%. $\eta_{inh}$ of the resulting solid polymer was 3.60.

EXAMPLE 8

Dimethyldiallylamine hydrochloride containing 20% by weight of water is solid at room temperature (15°C) and becomes slurry if heated to 20°–30°C. Using a procedure similar to that described in Example 1, 200 g of said slurry about 2-3 mm in thickness was irradiated for 24 hours. The yield was 81.81%. $\eta_{inh}$ of the solid polymer was 1.95. When said slurry was irradiated for 48 hours, the yield of the polymer was 90.6% and $\eta_{inh}$ was 2.02.

EXAMPLE 9

Using a procedure similar to that described in Example 1, 500 g of a slurry of diethyldiallylammonium chloride containing 10% by weight of water about 2–3 mm in thickness was irradiated for 10 hours. The yield of the solid polyamine was 81.2%, and $\eta_{inh}$ was 2.20. When said slurry was irradiated for 48 hours, the yield of the polymer was 95.6% and $\eta_{inh}$ was 2.31.

EXAMPLE 10

Using a procedure similar to that described in Example 1, 150 g of a slurry of diallylpyrrolidinium chloride containing 10% by weight of water about 2–3 mm in thickness was irradiated for 24 hours. The yield of the solid polymer was 41.6% and $\eta_{inh}$ was 0.97.

EXAMPLE 11

Using a procedure similar to that described in Example 1, 240 g of a slurry of diallylmorpholinium chloride containing 10% by weight of water about 2–3 mm in thickness was irradiated for 40 hours. The yield of the solid polymer was 83.1% and $\eta_{inh}$ was 2.20.

EXAMPLE 12

Using a procedure similar to that described in Example 1, an admixed slurry of 1020 g of Slurry I and 184 g of methyldiallylamine hydrochloride (the molar ratio of diallyldimethylammonium chloride to methyldiallylamine hydrochloride being 6:1) about 7–10 mm in thickness was irradiated for 48 hours. The yield of the solid polymer was 74.4% and $\eta_{inh}$ was 3.30. Infrared spectrum of the polymer showed absorption bands due to a tertiary amine hydrochloride at 2400–2800 cm$^{-1}$. The polymer was soluble in water. These results show that the obtained polymer is a cyclic copolymer of diallyldimethylammonium chloride and methyldiallylamine hydrochloride. Example 13

Using a procedure similar to that described in Example 1, an admixed slurry of 680 g of Slurry I and 184 g of methyldiallylamine hydrochloride (the molar ratio of diallyldimethylammonium chloride to methyldiallylamine hydrochloride being 4:1) about 4 mm in thickness was irradiated for 48 hours. The yield of the solid polymer was 69.9% and $\eta_{inh}$ was 3.0.

EXAMPLE 14

Using a procedure similar to that described in Example 1, 1000 g of a slurry of methylbenzyldiallylammonium chloride containing 13.4% by weight of water about 2–4 mm in thickness was irradiated for 100 hours. The yield of the resulting solid polymer was 91.0% and $\eta_{inh}$ was 0.53.

EXAMPLE 15

Using a process similar to that described in Example 1, 500 g of a slurry of methyldiallylamine phosphate containing 8.8% by weight of water about 2–4 mm in thickness was irradiated for 48 hours. The yield of the resulting solid polymer was 78.9% and $\eta_{inh}$ was 0.52.

EXAMPLES 16–28, Comparative EXAMPLES 1–2, Reference EXAMPLE 1

A slurry containing about 95% by weight of a monomer was prepared by adding 2.111 kg of water to 40 kg of diallyldimethylammonium chloride (hereinafter referred to as Slurry II).

A mixture of 100 g of Slurry II and 1 g of a sensitizer solution was placed in a low-pressure polyethylene bag 0.1 mm in thickness and formed into a plate about 10 mm thickness. Said plate was placed on a glass plate and was irradiated by four fluorescent lamps, 40 candles, 120 cm long, having wavelength distribution as shown in FIG. 1, two of them placed 30 cm directly above and the rest of them placed 30 cm directly below said glass plate, for 5 hours. The slurry became hard paste-like after 10–20 minutes' irradiation and was solidified to give glass-like semitransparent material after 1 hour's irradiation. The temperature of the system was raised by polymerization heat. The yield and inherent viscosity of the resulting polymer were listed in Table 2. In Examples 17–28, variously combined sensitizers were used. The results were as shown in Table 2.

A sensitizer solution was prepared as follows: A compound of the formula (III) (0.1 mole) was mixed with 0.1 mole of a compound of the formulae (IV-a)–(IV-c) and a solvent was added to the resulting mixture to adjust the concentration of the compounds being 10–40% by weight. About 0.12–0.13 × 10$^{-2}$ mole of 1:1 interacted material derived from the compound of the formula (III) and the compound of the formulae (IV-a)–(IV-c) was included in 1 g of the solution. Table 1 shows variously combined sensitizers.

Table 1

| Compound of the formula (III) | Compound of the formulae (IV-a)–(IV-c) | Solvent | Abbreviation |
|---|---|---|---|
| Benzophenone | Hydroquinone | t-Butanol | BP-HQ-tBuOH |
| " | Hydroquinone | Methanol | BP-HQ-MeOH |
| " | Hydroquinone monomethyl ether | t-Butanol | BP-HQME-tBuOH |
| " | Dioxane | Methanol | BP-Dox-MeOH |
| " | Dioxane | Dioxane | BP-Dox |
| " | Morpholine | Methanol | BP-Mor-MeOH |
| " | N-Methyl morpholine | " | BP-MMor-MeOH |
| " | N-β-hydroxyethyl morpholine | " | BP-HEMor-MeOH |
| " | Hydroquinone monomethyl ether | " | BP-HQME-MeOH |
| " | Triethylamine | " | BP-TEA-MeOH |
| " | Triethanolamine | " | BP-TETHA-MeOH |
| " | Methyl-diallylamine | " | BP-MDAA-MeOH |
| " | Diallyl-benzylamine | " | BP-DABA-MeOH |
| Acetophenone | Hydroquinone | Acetophenone | AP-HQ |
| " | Dioxane | " | AP-Dox |
| " | Triethylamine | Methanol | AP-TEA-MeOH |

For comparison, the results obtained when no sensitizer was used, or benzophenone in t-butanol (BP-tBuOH) or acetophenone (AP) was used instead of a sensitizer were also listed in Table 2.

Table 2

| Example No. | Sensitizer | Amount of sensitizer (10$^{-2}$ mole) | Yield (%) | $\eta_{inh}$ |
|---|---|---|---|---|
| Reference Example 1 | None | — | 9.4 | 3.07 |
| Comparative Example 1 | BP-tBuOH | 0.22 | 46.3 | 3.41 |
| Comparative Example 2 | AP | 0.83 | 17.1 | 3.43 |

Table 2-Continued

| Example No. | Sensitizer | Amount of sensitizer ($10^{-2}$ mole) | Yield (%) | $\eta_{inh}$ |
|---|---|---|---|---|
| 16 | BP-HQ-tBuOH | 0.12 | 100 | 3.20 |
| 17 | BP-HQ-MeOH | " | 99.7 | 3.28 |
| 18 | BP-HQME-tBuOH | " | 87.6 | 3.18 |
| 19 | BP-Dox-MeOH | " | 96.5 | 3.38 |
| 20 | BP-Dox | " | 97.6 | 3.30 |
| 21 | BP-Mor-MeOH | " | 100 | 3.29 |
| 22 | BP-TEA-MeOH | " | 93.2 | 3.20 |
| 23 | BP-TETHA-MeOH | " | 96.0 | 3.47 |
| 24 | BP-MDAA-MeOH | " | 81.3 | 3.57 |
| 25 | BP-DABA-MeOH | " | 70.6 | 3.53 |
| 26 | AP-HQ | " | 78.6 | 3.30 |
| 27 | AP-Dox | " | 72.2 | 3.26 |
| 28 | AP-TEA-MeOH | " | 85.1 | 2.79 |

Infrated spectra of the polymers mentioned above were substantially the same as that of the polymer of diallyldimethylammonium chloride obtained by a conventional process.

EXAMPLE 29

Using a procedure similar to that described in Example 16, a mixture of 100 g of Slurry II and 1 g of BP-HQ-MeOH was irradiated for a time as listed in Table 3. The results were as shown in Table 3.

Table 3

| Irradiation time (hrs) | Amount of sensitizer ($10^{-2}$ mole) | Yield (%) | $\eta_{inh}$ |
|---|---|---|---|
| 1 | 0.12 | 58.5 | 3.21 |
| 2 | " | 75.7 | 3.20 |
| 3.5 | " | 92.0 | 3.18 |
| 4 | " | 95.8 | 3.19 |
| 5 | " | 99.7 | 3.28 |
| 48 | " | 99.2 | 3.58 |

EXAMPLE 30

A mixture of 7.0 kg of Slurry II and 70 g of BP-HQ-tBuOH was extruded through a slit into a plate about 10 mm in thickness on a belt conveyor. Said plate was irradiated by fluorescent lamps in the same manner as described in Example 16 for 3 hours. The yield of the resulting solid polyamine was 89.7% and $\eta_{inh}$ was 3.14.

EXAMPLE 31

Using a procedure similar to that described in Example 30, a mixture of 7.0 kg of Slurry II and 70 g of BP-Dox about 12 mm in thickness was irradiated for 4 hours. The yield of the resulting solid polyamine was 86.3% and $\eta_{inh}$ was 3.25.

EXAMPLE 32

Using a procedure similar to that described in Example 30, a mixture of 7.0 kg of Slurry II and 70 g of BP-Mor-MeOH about 10 mm in thickness was irradiated for 2 hours. The yield of the resulting solid polyamine was 90.7% and $\eta_{inh}$ was 3.01.

EXAMPLE 33

Using a procedure similar to that described in Example 16, a mixture of 500 g of Slurry II and 5 g of BP-MMor-MeOH was irradiated for 5 hours. The yield of the resulting solid polyamine was 89.7% and $\eta_{inh}$ was 3.12.

EXAMPLE 34

Using a procedure similar to that described in Example 16, a mixture of 1.5 kg of Slurry II and 15 g of BP-HEMor-MeOH was irradiated for 3 hours. The yield of the resulting solid polyamine was 89.2% and $\eta_{inh}$ was 3.41.

EXAMPLE 35

Using a procedure similar to that described in Example 16, a mixture of 800 kg of Slurry II and 8 g of BP-HQME-MeOH was irradiated for 3 hours. The yield of the resulting solid polyamine was 96.7% and $\eta_{inh}$ was 3.40.

EXAMPLE 36

A slurry containing about 90.9% by weight of a monomer was prepared by adding 1.0 kg of water to 10 kg of diallylmorpholinium chloride (hereinafter referred to as Slurry III).

Using a procedure similar to that described in Example 16, a mixture of 100 g of Slurry III and 1 g of BP-HQ-MeOH was irradiated for 5 hours. The yield of the resulting solid transparent polymer was 98.5% and $\eta_{inh}$ was 3.07. Infrared spectrum of this polymer was the same as that of the polymer of diallylmorpholinium chloride prepared by a conventional process.

EXAMPLE 37

Using a procedure similar to that described in Example 16, a mixture of 100 g of Slurry III and 1 g of BP-Dox was irradiated for 5 hours. The yield of the resulting solid polyamine was 97.6% and $\eta_{inh}$ was 3.25.

EXAMPLE 38

Using a procedure similar to that described in Example 30, a mixture of 1.0 kg of Slurry III and 10 g of BP-Mor-MeOH about 8 mm in thickness was irradiated for 5 hours. The yield of the resulting solid polyamine was 95.2% and $\eta_{inh}$ was 3.31.

EXAMPLE 39

Using a procedure similar to that described in Example 38, a mixture of 7.0 kg of Slurry III and 70 g of BP-Dox-MeOH was irradiated for 5 hours. The yield of the resulting solid polyamine was 90.2% and $\eta_{inh}$ was 3.15.

EXAMPLE 40

A slurry containing about 90.9% by weight of a monomer was prepared by adding 100 g of water to 1.0 kg of diallylpyrrolidinium chloride (hereinafter referred to as Slurry IV).

Using a procedure similar to that described in Example 16, a mixture of 100 g of Slurry IV and 1 g of BP-HQ-tBuOH was irradiated for 5 hours. The yield of the resulting solid polymer was 80.5% and $\eta_{inh}$ was 2.56. Infrared spectrum of this polymer was the same as that of the polymer of diallylpyrrolidinium chloride prepared by a conventional process.

When the photopolymerization was carried out without the sensitizer, the yield of the resulting polymer was 21.8% after 24 hours' irradiation and 69.1% after 72 hours' irradiation.

EXAMPLE 41

Using a procedure similar to that described in Example 30, a mixture of 400 g of Slurry IV and 4 g of BP-Mor-MeOH about 8 mm in thickness was irradiated for 5 hours. The yield of the resulting solid polyamine was 78.6% and $\eta_{inh}$ was 2.85.

EXAMPLE 42

Using a procedure similar to that described in Example 41, a mixture of 400 g of Slurry IV and 4 g of BP-Dox was irradiated for 5 hours. The yield of the resulting solid polyamine was 77.8% and $\eta_{inh}$ was 2.97.

EXAMPLE 43

Using a procedure similar to that described in Example 16, a mixture of 170.2 g of Slurry II, 100 g of Slurry III and 3 g of BP-Mor-MeOH was irradiated for 5 hours. The solid copolymer of diallyldimethylammonium chloride and diallylmorpholinium chloride was obtained in 89.7% yield and $\eta_{inh}$ was 3.00.

EXAMPLE 44

Using a procedure similar to that described in Example 16, a mixture of 443 g of Slurry II, 76.5 g of methyldiallylamine hydrochloride containing 19.6% by weight of water and 5 g of BP-HQ-MeOH was irradiated for 5 hours. The solid semitransparent copolymer of diallyldimethylammonium chloride and methyldiallylamine hydrochloride was obtained in 88.7% yield and $\eta_{inh}$ was 2.48.

EXAMPLE 45

A slurry containing about 95% by weight of a monomer was prepared by adding 1.05 kg of water to 20 kg of diallyldimethylammonium chloride (hereinafter referred to as Slurry V-A). A solution containing about 69.4% by weight of maleic anhydride was prepared by dissolving 1135 g of maleic anhydride in 500 g of acetone (hereinafter referred to as Slurry V-B).

Using a procedure similar to that described in Example 16, mixtures of Slurry V-A and Slurry V-B as listed in Table 4 was irradiated for a time as listed in Table 4. The yields and $\eta_{inh}$ of the resulting solid semitransparent polymers were as shown in Table 4. In calculating the yield, maleic anhydride is converted to maleic acid by combining the water in Slurry V-A with maleic anhydride.

Table 4

| Starting composition | | | | | |
|---|---|---|---|---|---|
| Molar ratio of DDAC to maleic acid | Slurry V-A (g) | Slurry V-B (g) | Irradiation time (hrs) | Yield (%) | $\eta_{inh}$ |
| 1:1 | 170 | 140 | 25 | 35.1 | 0.134 |
| 1:0.5 | 340 | 140 | 25 | 91.2 | 0.640 |
| 1:0.5 | 340 | 140 | 48 | 100 | 0.690 |
| 1:0.1 | 850 | 70 | 25 | 100 | 1.330 |
| 1:0.1 | 850 | 70 | 48 | 100 | 1.311 |
| 1:0.05 | 680 | 28 | 25 | 100 | 1.281 |
| 1:0.05 | 680 | 28 | 48 | 96.8 | 1.397 |

Note) DDAC: diallyldimethylammonium chloride

The resulting polymers were highly hygroscopic and soluble in water and methanol but insoluble in acetone. Infrared spectra of these polymers show the same absorption bands as those of the polymer of diallyldimethylammonium chloride and a sharp absorption band due to a carbonyl group at near 1720 cm$^{-1}$ intensity of which increased with an increase of the proportion of maleic anhydride in the starting mixture. These results suggest that the obtained polymers are linear high polymeric amphoteric electrolytes having a repeating unit of the formula,

EXAMPLE 46

Using a procedure similar to that described in Example 16, mixtures of Slurry V-A, maleic anhydride, water and a sensitizer, BP-Dox, as listed in Table 5 were irradiated for 20 hours. BP-Dox was prepared by dissolving 18.222 g of benzophenone in 65.0 g of dioxane. The results obtained were as shown in Table 5.

Table 5

| Starting composition | | | | | |
|---|---|---|---|---|---|
| Molar ratio of DDAC to maleic acid | Slurry V-A (g) | Maleic anhydride (g) | Water (g) | BP-Dox (g) | Yield (%) | $\eta_{inh}$ |
| 1:1 | 851 | 490 | 120 | 14 | 100 | 0.445 |
| 1:0.5 | 851 | 245 | 13 | 11 | 98.4 | 0.575 |
| 1:0.1 | 851 | 49 | 0 | 9 | 100 | 0.782 |

Infrared spectra of the obtained polymers were substantially the same as those of the copolymers obtained in Example 45.

EXAMPLE 47, Comparative EXAMPLE 3

Using a procedure similar to that described in Example 16, admixed slurrys as listed in Table 6 were irradiated for 5 hours. As a sensitizer, BP-Mor-MeOH, which was prepared by dissolving 9.111 g of benzophenone and 4.356 g of morpholine in 28.0 g of methanol, was used. The results obtained were as shown in Table 6.

For comparison, the results obtained when a 25% aqueous ammonium persulfate solution, a typical radical initiator, was used instead of BP-Mor-MeOH were also listed in Table 6.

Infrared spectra of the obtained polymers were substantially the same as those of the copolymers obtained in Example 45.

Table 6

| | Slurry VI Molar ratio of DDAC to maleic acid | Wt. (g) | Sensitizer BP-Mor-MeOH (g) | APS$_{aq}$ (g) | Yield (%) | $\eta_{inh}$ |
|---|---|---|---|---|---|---|
| No. | | | | | | |
| Example 47-1 | 1:0.5 | 100 | 1 | — | 83.9 | 0.999 |

Table 6-Continued

| No. | Slurry VI Molar ratio of DDAC to maleic acid | Wt. (g) | Sensitizer BP-Mor-MeOH (g) | $APS_{aq}$ (g) | Yield (%) | $\eta_{inh}$ |
| --- | --- | --- | --- | --- | --- | --- |
| -2 | 1:0.5 | 100 | 2 | — | 95.3 | 0.668 |
| -3 | 1:0.5 | 100 | 3 | — | 88.7 | 0.634 |
| -4 | 1:0.5 | 100 | 4 | — | 85.6 | 0.532 |
| Comparative Example | | | | | | |
| 3-1 | 1:0.5 | 100 | — | 1 | 78.8 | 0.666 |
| -2 | 1:0.5 | 100 | — | 2 | 31.0 | 0.407 |
| -3 | 1:0.5 | 100 | — | 3 | 24.7 | 0.242 |
| -4 | 1:0.5 | 100 | — | 4 | 21.3 | 0.244 |

Note)
Slurry VI contains 851 parts by weight of Slurry V-A, 245 parts by weight of maleic anhydride and 13 parts by weight of water.
$APS_{aq}$ means an aqueous ammonium persulfate solution

EXAMPLE 48

A mixture of 5 kg of Slurry VI and 100 ml of BP-Mor-MeOH as used in Example 47 was extruded from a slit into a plate about 10 mm in thickness on a belt conveyer. Said plate was irradiated by fluorescent lamps in the same manner as described in Example 16 for 20 hours. The yield of the resulting polymeric amphoteric electrolyte was 92.5% and $\eta_{inh}$ was 0.473. Infrared spectrum of the obtained polymer was substantially the same as those of the copolymers obtained in Example 45. Polymerization ratio of diallyldimethylammonium chloride (DDAC) to maleic acid determined by titration of carboxylic groups in the polymer with an aqueous solution of sodium hydroxide was DDAC : maleic acid = 1:046.

EXAMPLE 49

Using a similar procedure to that described in Example 48, a mixture of 8.51 kg of Slurry V-A, 490 g of maleic anhydride and 180 ml of BP-Mor-MeOH as used in Example 47 was irradiated for 5 hours. The yield of the resulting copolymer was 97.43% and $\eta_{inh}$ was 0.906. polymerization ratio of diallyldimethylammonium chloride to maleic acid determined by titration with sodium hydroxide was 1:0.08.

EXAMPLES 50 and 51

A slurry containing about 90.9% by weight of a monomer was prepared by adding 200 g of water to 2 kg of diallylmorpholinium chloride. To 1121 g of the resulting slurry (about 5 moles), 98 g (about 1.0 mole) of maleic anhydride was added to obtain Slurry VII. Using a procedure similar to that described in Example 16, photopolymerizations of Slurry VII were carried out under the conditions as listed in Table 7. The results obtained were as shown in Table 7.

Table 7

| Example No. | Slurry VII (g) | BP—Mor—MeOH (ml) | Irradiation time (hrs) | Yield (%) | $\eta_{inh}$ |
| --- | --- | --- | --- | --- | --- |
| 50 | 500 | — | 20 | 97.4 | 1.213 |
| 51 | 500 | 10 | 5 | 100 | 1.025 |

The resulting polymers were soluble in water and methanol but insoluble in acetone. Infrared spectra of the polymers shown the absorption bands of the polymer of diallylmorpholinium chloride together with an absorption band due to a carbonyl group at 1720 cm⁻¹. These results suggest that the obtained polymers are linear high polymeric amphoteric electrolytes having a repeating unit of the formula,

EXAMPLE 52

A slurry containing about 90.9% by weight of a monomer was prepared by adding 50 g of water to 500 g of diallylpyrrolidinium chloride. To 206.5 g of the resulting slurry (1 mole of diallylpyrrolidinium chloride) 20 g of maleic anhydride (0.2 mole) and 4 ml of BP-Dox as used in Example 46 were added. Using a procedure similar to that described in Example 16, the resulting mixture was irradiated for 5 hours. The yield of the resulting polymer was 94.2% and $\eta_{inh}$ was 0.976. Infrared spectrum of this polymer shows the absorption bands of the polymer of diallylpyrrolidinium chloride together with an absorption band due to a carbonyl group at 1720 cm⁻¹. These results suggest that the obtained polymer is a linear high polymeric amphoteric electrolyte having a repeating unit of the formula,

EXAMPLES 53–54

A slurry containing about 95% by weight of a monomer was prepared by adding 2.1 kg of water to 40 kg of diallyldimethylammonium chloride (hereinafter referred to as Slurry VIII). Using a procedure similar to that described in Example 16, a mixture of 170.2 g of Slurry VIII and 1.6 of sulfer dioxide, or 170.2 g of Slurry VIII was irradiated for a time as listed in Table 8. The results obtained were as shown in Table 8.

Table 8

| Example No. | Slurry VIII (g) | $SO_2$ (g) | Irradiation time (hrs) | Yield (%) | $\eta_{inh}$ |
| --- | --- | --- | --- | --- | --- |
| 53-1 | 170.2 | 0 | 5 | 9.4 | 3.07 |
| -2 | 170.2 | 0 | 48 | 89.4 | 3.10 |
| 54-1 | 170.2 | 1.6 | 3 | 19.5 | 3.08 |
| -2 | " | " | 5 | 44.2 | 2.96 |
| -3 | " | " | 8 | 93.5 | 2.99 |
| -4 | " | " | 10 | 98.2 | 3.09 |

Figure 3:
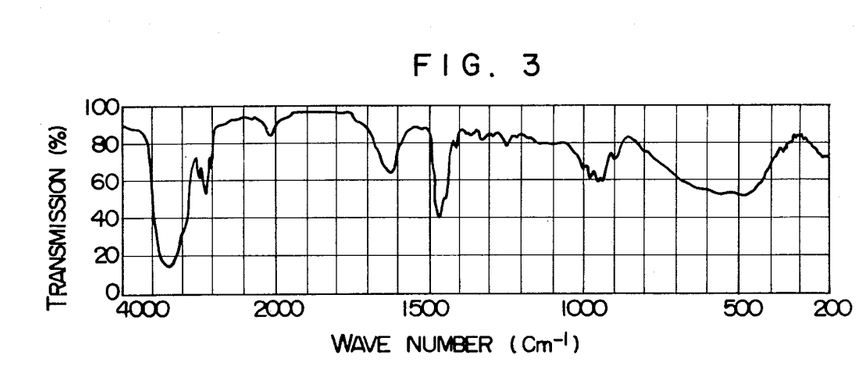
Figure 4:
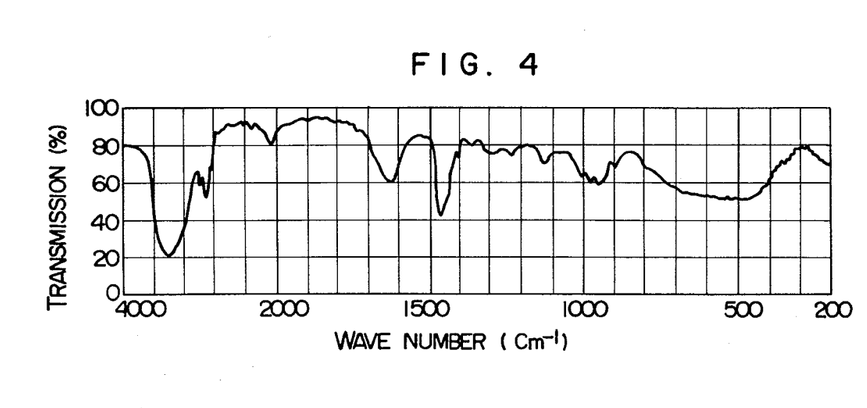

FIG. 3 is infrared spectrum of the polymer of diallyldimethylammonium chloride obtained by a conventional process. FIG. 4 is infrared spectrum of the polymer obtained in Example 54-2. In FIG. 4, no absorption due to sulfur dioxide is identified substantially. Further FIG. 4 is substantially the same as FIG. 3.

EXAMPLE 55

A mixture of 10.22 kg of Slurry VIII and 192 g of sulfur dioxide was extruded through a slit into a plate about 10 mm in thickness on a belt conveyor. Said plate was irradiated by fluorescent lamps in the same manner as described in Example 16 for 10 hours. The yield of the resulting solid polymer was 89.4% and $\eta_{inh}$ was 3.82.

EXAMPLE 56

Using a procedure similar to that described in Example 16, a mixture of 443 g of Slurry VIII, 76.5 g of a slurry of methyldiallylamine hydrochloride containing 19.6% by weight of water (heated to 20°–30°C) and 6.6 g of sulfur dioxide was irradiated for 10 hours. The copolymer of diallyldimethylammonium chloride and methyldiallylamine hydrochloride in solid was obtained in 88.7% yield, $\eta_{inh}$ being 2.48.

EXAMPLE 57

A slurry containing about 91% by weight of a monomer was prepared by adding 100 g of water to 1 kg of diallylmorpholinium chloride. Using a procedure similar to that described in Example 16, a mixture of 100 g of said slurry and 5 g of sulfur dioxide was irradiated for 10 hours. The yield of the resulting solid polymer was 87.2% and $\eta_{inh}$ was 1.98. Infrared spectrum of the polymer was substantially the same as that of the polymer of diallylmorpholinium chloride prepared by a conventional process and absorption due to sulfur dioxide was substantially not identified.

EXAMPLE 58

To 100 g of a slurry of methyldiallylamine hydrochloride containing 19.6% by weight of water, 20 g of a 30% aqueous solution of an equimolar mixture of sulfur dioxide and diallyldimethylammonium chloride was added and mixed well. Said mixture was irradiated for 15 hours using a procedure similar to that described in Example 16. The yield of the resulting solid polymer was 79.2% and $\eta_{inh}$ was 1.87. Infrared spectrum of this polymer was substantially the same as that of the polymer of methyldiallylamine hydrochloride obtained by a conventional process.

EXAMPLE 59

A mixture of 850 g of Slurry VIII, 70 g of an acetone solution of maleic anhydride containing 70% by weight of maleic anhydride (the molar ratio of diallyldimethylammonium chloride to maleic anhydride being 1:0.1) and 20 g of sulfur dioxide was prepared. Using a procedure similar to that described in Example 16, said mixture was irradiated for 15 hours. The yield of the resulting solid copolymer was 98.2% and $\eta_{inh}$ was 1.41. In calculating the yield, maleic anhydride was converted to maleic acid by combining the water in Slurry VIII with maleic anhydride.

The obtained polymer was highly hygroscopic and soluble in water and methanol but insoluble in acetone. Infrared spectrum of this polymer shows the absorption bands of the polymer of diallyldimethylammonium chloride together with an absorption band due to a carbonyl group at near 1720 cm$^{-1}$. Polymerization ratio of diallyldimethylammonium chloride to maleic acid, determined by titration with an aqueous solution of sodium hydroxide, was 1:0.094 in molar ratio. These results suggest that the obtained polymer is a linear high polymeric amphoteric electrolyte having a repeating unit of the formula,

EXAMPLE 60

Using a procedure similar to that described in Example 59, a mixture of 851 g of Slurry VIII, 245 g of solid maleic anhydride (the molar ratio of diallyldimethylammonium chloride to maleic anhydride being 1:0.5), 13 g of water and 20 g of sulfur dioxide was irradiated for 15 hours. The yield of the resulting solid compolymer was 98.2% and $\eta_{inh}$ was 0.575.

EXAMPLE 61

A mixture of 1000 g of Slurry VIII, 20.88 g of acrylamine and 4 g of sulfur dioxide was prepared. Said mixture was placed in a low-pressure polyethylene bag 0.1 mm in thickness and formed into a plate about 10 mm in thickness. Said plate was placed on a glass plate and was irradiated by 8 fluorescent lamps, 40 candles, 120 cm long, having wavelength distribution as shown in FIG. 1, four of them placed 30 cm directly above and the rest of them placed 30 cm directly below said glass plate, for 3 hours. The yield of the resulting semitransparent solid polymer was 90.0% and $\eta_{inh}$ was 2.61.

The obtained polymer was soluble in water and methanol but insoluble in acetone. Infrared spectrum of this polymer showed the absorption bands due to the polymer of diallyldimethylammonium chloride together with an absorption band due to a carbonyl group at near 1670 cm$^{-1}$. These results suggest that the obtained polymer is a linear copolymer having a repeating unit of the formula,

EXAMPLE 62

Using a procedure similar to that described in Example 61, a mixture of 851 g of Slurry VIII, 36 g of acrylic acid and 4 g of sulfur dioxide was irradiated for 3 hours. The yield of the resulting solid polymer was 88.0% and $\eta_{inh}$ was 1.76. Infrared spectrum of this polymer showed the absorption bands due to the polymer of diallyldimethylammonium chloride together with an absorption band due to a carbonyl group at near 1720 cm$^{-1}$. These results suggest that the obtained polymer is a linear copolymer having a repeating unit of the formula,

EXAMPLE 63

Using a procedure similar to that described in Example 16, a mixture of 95 g of diallyldimethylammonium chloride containing 4% by weight of water, 6.3 g of N-vinylpyrrolidone (the molar ratio of diallyldimethylammonium chloride to N-vinylpyrrolidone being 1:0.1) and 2 g of sulfur dioxide was irradiated for 15 hours. The yield of the resulting solid polymer was 85.1% and $\eta_{inh}$ was 1.43. Infrared spectrum of the obtained polymer showed the absorption bands due to the polymer of diallyldimethylammonium chloride together with an absorption band due to an amide linkage at near 1650 cm$^{-1}$. These results suggest that the obtained polymer is a linear copolymer having a repeating unit of the formula,

What is claimed is:
1. A process for producing a polymer or copolymer of diallylamine derivative of the formula, wherein $R^1$ is hydrogen or methyl; $R^2$ and $R^3$ are independently hydrogen, allyl, methallyl, straight-chain or branched-chain alkyl having 1–6 carbon atoms, phenylalkyl having 7–19 carbon atoms, or hydroxyalkyl of the formula, HO—(CH$_2$)$_m$—, in which $m$ is an integer of 1–6 or $R^2$ and $R^3$ may form together with the adjacent N atom pyrrolidyl, piperidyl or morpholino; and Y is halogen or inorganic acid anion, which comprises (a) conducting photopolymerization of a solution or slurry comprising at least one diallylamine derivative of the formula (I) with or without maleic acid or maleic anhydride and a solvent or non-solvent in an amount of 30% by weight or less based on the total weight of the monomer or monomers with irradiation of light having wavelengths of 150–500 μ in the presence or absence of a sensitizer, or (b) conducting photopolymerization of a solution or slurry comprising at least one diallylamine derivative of the formula (I), N-vinylpyrrolidone or at least one vinyl compound of the formula, wherein $R^4$ is hydrogen or methyl; and Z is a group of the formula, —OR$^5$ (wherein R$^5$ is hydrogen, methyl, a group of the formula, —(CH$_2$)$_n$—OH in which n is an integer of 1–5, or a group of the formula, in which $R^6$, $R^7$ $R^8$ are independently hydrogen, alkyl having 1–3 carbon atoms or benzyl; J is halogen, and n is as defined above) or a group of the formula, wherein $R^9$ and $R^{10}$ are independently hydrogen, alkyl having 1–5 carbon atoms or a group of the formula, —(CH$_2$)$_p$—OH in which p is an integer of 1–3, and a solvent or non-solvent in an amount of 30% by weight or less based on the total weight of the monomers with irradiation of light having wavelengths of 150–500 mμ in the presence of a charge-transfer complex of sulfur dioxide and a diallylamine derivative of the formula (I).

2. A process according to claim 1, wherein the solution or slurry comprises at least one diallylamine derivative of the formula (I) and a solvent or non-solvent in an amount of 30% by weight or less based on the total weight of the monomer or monomers.

3. A process according to claim 1, wherein the solution or slurry comprises at least one diallylamine derivative of the formula (I), maleic acid or maleic anhydride and a solvent or non-solvent in an amount of 30% by weight or less based on the total weight of the monomers.

4. A process according to claim 1, wherein the solvent or non-solvent is water, or methyl alcohol, ethyl alcohol, isopropyl alcohol, dimethylsulfoxide, acetone or an aqueous solution thereof.

5. A process according to claim 1, wherein the photopolymerization is carried out in the absence of a sensitizer.

6. A process according to claim 1, wherein the photopolymerization is carried out in the presence of a sensitizer.

7. A process according to claim 6, wherein the sensitizer is a mixture of at least one compound of the formula, wherein A is phenyl, phenyl substituted by $R^{11}$ or a straight-chain or branched-chain alkyl having 1–5 carbon atoms; and $R^{11}$ is hydrogen, halogen, methoxy, nitro or straight-chain or branched-chain alkyl having 1–5 carbon atoms, and at least one member selected from the group consisting of compounds of the formulae, (IV-a)  (IV-b)  (IV-c)

wherein $R^{11}$ is as defined above; $R^{12}$ is hydrogen or straight-chain or branched-chain alkyl having 1–5 carbon atoms; X is —$CH_2$—, —O—, —$NR^{12}$ or —N($CH_2CH_2OH$)—; $R^{13}$, $R^{14}$ and $R^{15}$ are independently hydrogen, alkyl having 1–3 carbon atoms, hydroxymethyl, β-hydroxyethyl, γ-hydroxypropyl, benzyl, allyl or methallyl but $R^{13}$, $R^{14}$ and $R^{15}$ cannot be hydrogens at the same time.

8. A process according to claim 6, wherein the sensitizer is a mixture of at least one member selected from the group consisting of benzophenone and acetophenone and at least one member selected from the group consisting of hydroquinone, hydroquinone monomethyl ether, hydroquinone monoethyl ether, dioxane, morpholine, N-methyl morpholine and N-(β-hydroxyethyl) morpholine.

9. A process according to claim 6, wherein the sensitizer is a charge-transfer complex of sulfur dioxide and a diallylamine derivative of the formula (I).

10. A process according to claim 9, wherein the diallylamine derivative of the formula (I) is a diallylammonium salt derivative.

11. A process according to claim 9, wherein the diallylamine derivative of the formula (I) is diallyldimethylammonium chloride, diallyldiethylammonium chloride or diallylmorpholinium chloride.

12. A process according to claim 1, wherein the photopolymerization is carried out at a temperature of from −10° to 100°C.

13. A process according to claim 1, wherein the photopolymerization is initiated at a temperature of 60°C or lower.

14. A process according to claim 1, wherein the solution or slurry is formed into a film or plate 0.1–5 cm in thickness.

15. A process according to claim 14, wherein said film or plate is covered by a thin film showing no absorption of light in the 300–450 mμ region.

16. A process according to claim 1, wherein one or more fluorescent lamps, one or more low-pressure mercury-arc lamps or sunlight is used as a light source.

17. A process according to claim 1, wherein the photopolymerization is carried out with irradiation of light having wavelengths of 200–500 mμ.

18. A process according to claim 1, wherein the diallylamine derivative of the formula (I) is at least one member selected from the group consisting of diallyldimethylammonium chloride, methyldiallylamine hydrochloride, diethyldiallylammonium chloride, diallylpyrrolidinium chloride, diallylmorpholinium chloride, methylbenzyldiallylammonium chloride and methyldiallylamine phosphate.

19. A process according to claim 1, wherein the vinyl compound of the formula (II) is at least one member selected from the group consisting of acrylamide, acrylic acid, N-vinylpyrrolidone, dimethylaminoethyl methacrylate hydrochloride and dimethylbenzylammoniumethyl methacrylate chloride.

20. A process according to claim 1, wherein the copolymerization ratio is 0.005–2.5 moles of N-vinylpyrrolidone or a vinyl compound of the formula (II) per mole of a diallylamine derivative of the formula (I).

21. A process according to claim 1, wherein the copolymerization ratio is 0.01–2.0 moles of maleic acid per mole of diallylamine derivative of the formula (I).

22. A process according to claim 7, wherein the sensitizer is dissolved in an alcohol.

23. A process according to claim 9, wherein the charge-transfer complex of sulfur dioxide and a diallylamine derivative of the formula (I) is dissolved in water or methyl alcohol, ethyl alcohol, isopropyl alcohol, dimethyldulfoxide, acetone or an aqueous solution thereof.

24. A copolymer of a diallylamine derivative of the formula (I) and maleic acid.

25. A copolymer of diallyldimethylammonium chloride and maleic acid.

26. A copolymer of diallylpyrrolidinium chloride and maleic acid.

27. A copolymer of diallylmorpholinium chloride and maleic acid.

* * * * *